United States Patent [19]

Nakamura et al.

[11] Patent Number: 5,754,355
[45] Date of Patent: *May 19, 1998

[54] DISK DRIVE APPARATUS AND READ ERROR RECOVERY METHOD IN A DISK DRIVE APPARATUS

[75] Inventors: Takashi Nakamura, Fujisawa; Isao Yoneda; Yuji Yokoe, both of Yokohama; Kazushi Tsuwako, Machida; Fujio Harako, Fujisawa; Katsumi Suda; Michio Nakajima, both of Sagamihara; Kenji Ogasawara, Fujisawa, all of Japan

[73] Assignee: International Business Machines Corporation, Armonk, N.Y.

[*] Notice: The term of this patent shall not extend beyond the expiration date of Pat. No. 5,696,643.

[21] Appl. No.: 633,596

[22] Filed: Apr. 17, 1996

[30] Foreign Application Priority Data

Sep. 21, 1995 [JP] Japan .................. 7-242832

[51] Int. Cl.$^6$ ............................................... G11B 15/46
[52] U.S. Cl. ........................ 360/73.03; 360/75; 360/53
[58] Field of Search .................... 360/75, 73.03, 360/137, 73.01, 70, 31, 105, 109, 113, 53, 78.04, 78.08, 78.14

[56] References Cited

U.S. PATENT DOCUMENTS

| | | | |
|---|---|---|---|
| 4,635,139 | 1/1987 | Nguyen et al. | 360/25 |
| 4,669,011 | 5/1987 | Lemke | 360/103 |
| 5,233,482 | 8/1993 | Galbraith et al. | 360/46 |
| 5,461,521 | 10/1995 | Ito et al. | 360/75 |
| 5,527,110 | 6/1996 | Abraham et al. | 360/75 X |
| 5,537,034 | 7/1996 | Lewis | 324/212 |
| 5,612,830 | 3/1997 | Gregory et al. | 360/71 X |

FOREIGN PATENT DOCUMENTS

| | | | |
|---|---|---|---|
| 010594 | 4/1984 | European Pat. Off. | 360/75 |
| 0044123 | 4/1981 | Japan | 360/75 |
| 0184679 | 8/1987 | Japan | 360/75 |
| 0528472 | 2/1993 | Japan . | |

OTHER PUBLICATIONS

Patent Abstracts of Japan, vol. 17, No. 311, P-1556, Jun. 14, 1993.

IBM Technical Disclosure Bulletin, vol. 34, No. 11, Apr. 1992, pp. 217-219, Fast Offset Recovery for Thermal Asperity Data Recovery Procedure.

Primary Examiner—Andrew L. Sniezek
Attorney, Agent, or Firm—Matthew J. Bussan

[57] ABSTRACT

A disk drive apparatus and read error recovery method in a disk drive apparatus removes thermal asperities on disk surfaces. A projection, such as a thermal asperity, on the recording surfaces of disks is detected when a signal transducer head contacts the projection. The flying height of the signal transducer head is lowered, e.g., by changing the disk rotation speed from the normal rotation speed in read/write operations or by heating a suspension having a bimetal element, while the signal transducer head is positioned over the detected projection on the track. The signal transducer head strikes the projection to break the projection. This avoids a subsequent error from being caused by the thermal asperity.

15 Claims, 6 Drawing Sheets

DISK DRIVE APPARATUS AND READ ERROR RECOVERY METHOD IN A DISK DRIVE APPARATUS

BACKGROUND OF THE INVENTION

1. Technical Field

This invention relates to a disk drive apparatus and, more specifically, to a disk drive apparatus and method for eliminating read errors on the disk surface, which are caused by projections, such as thermal asperities.

2. Description of the Prior Art

A magnetic disk drive apparatus is an apparatus for recording and reading data on the surfaces of disks through the use of a changing magnetic field. A transducer head is positioned over a specific position on a disk track on which data is recorded, and reads or writes data on the track of the disk spinning at high speed. The head is slightly apart from the disk surface and positioned over the specific track. Recently, a magnetoresistive (MR) head is used as a transducer head. The output resistance of this head changes in response to changes in the magnetic field. This resistance change is converted into a direct current voltage signal by applying a predetermined electric current to the MR head to read data.

A thermal asperity is a projection produced on a disk which prevents the reading and writing of data on the disk. The thermal asperity may increase the temperature of the MR stripe of an MR head locally by 100° C. or more. This temperature rise is caused by a mechanical collision between a head area containing the MR stripe and a projection on the disk surface. Because a change in resistance of the MR head caused by a change in the magnetic field on a magnetic media resulting from a normal read operation is less than one percent of the MR stripe's resistance, a signal change caused by a temperature rise may substantially exceed the resistance change caused by a normal read signal, preventing the normal read of data.

One prior approach to solve the thermal asperity problem with read data is, when a drastic signal change which is likely to be caused by a thermal asperity occurs, to make an appropriate modification to the read signal so that it can be used as normal read data. Another prior approach is to correct an erroneous read signal by using an appropriate error correction method, such as an error correcting code (ECC) method. However, these approaches have disadvantages. First, additional hardware is required to be added externally. Second, large burst errors unrecoverable by using ECCs cannot be corrected, and eventually must be treated as unreadable hardware error. Thus, these prior approaches do not provide an adequate solution to the thermal asperity problem.

OBJECTS OF THE INVENTION

It is an object of this invention to provide a disk drive apparatus and method whereby, when a thermal asperity is encountered, the projection on the disk which causes the thermal asperity is removed to avoid a subsequent error from being caused by the thermal asperity. This makes it possible to resolve the above mentioned disadvantages of prior thermal asperity counter measures.

SUMMARY OF THE INVENTION

In order to realize the above mentioned and other objects, when a drastic signal change caused by a thermal asperity is detected by the MR head for reading data, or when a data read error occurs, a disk drive apparatus according to an embodiment of this invention lowers the flying height of the signal transducer head by changing the disk rotation speed and makes the surface of a component of the signal transducer head hit a projection on the disk to scrub it away. As one of the data recovery operations, this removes the basic cause of the thermal asperity.

This embodiment may be configured to use a positive pressure signal transducer head, which increases its flying height as the disk rotation speed increases. In the positive pressure signal transducer head configuration, this embodiment lowers the flying height of the signal transducer head by reducing the disk rotation speed from the normal speed used in read or write operation. As a result, a surface of the signal transducer head known as the Air Bearing Surface (ABS) hits and scrubs a projection on the disk to break the projection.

Alternatively, this embodiment may be configured to use a negative pressure signal transducer head, which decreases its flying height as the disk rotation speed increases. In the negative pressure signal transducer head configuration, this embodiment lowers the flying height of the signal transducer head by increasing the disk rotation speed from the normal speed in read or write operation. As a result, the ABS side strikes against and scrubs a projection on the disk to eliminate the projection.

In a disk drive apparatus according to another embodiment of this invention, a servo clock is supplied in accordance with a change of the disk rotation speed. In this embodiment, a servo signal recorded on the disk is read while the disk rotation speed is changed, and thereby accurate position control is accomplished to remove a projection.

Furthermore, in a disk drive apparatus according to yet another embodiment of this invention, a bimetal element and a heating element are attached to a head suspension, which is a mounting structure for a signal transducer head. In this embodiment, when the heating element is heated, the bimetal element is flexed to force the flying height of the signal transducer head lower to scrub away a projection, such as a thermal asperity.

Other features and advantages of this invention will become apparent from the following detailed description of the presently preferred embodiment of the invention, taken in conjunction with the accompanying drawings.

DESCRIPTION OF THE PREFERRED EMBODIMENT

Figure 1:
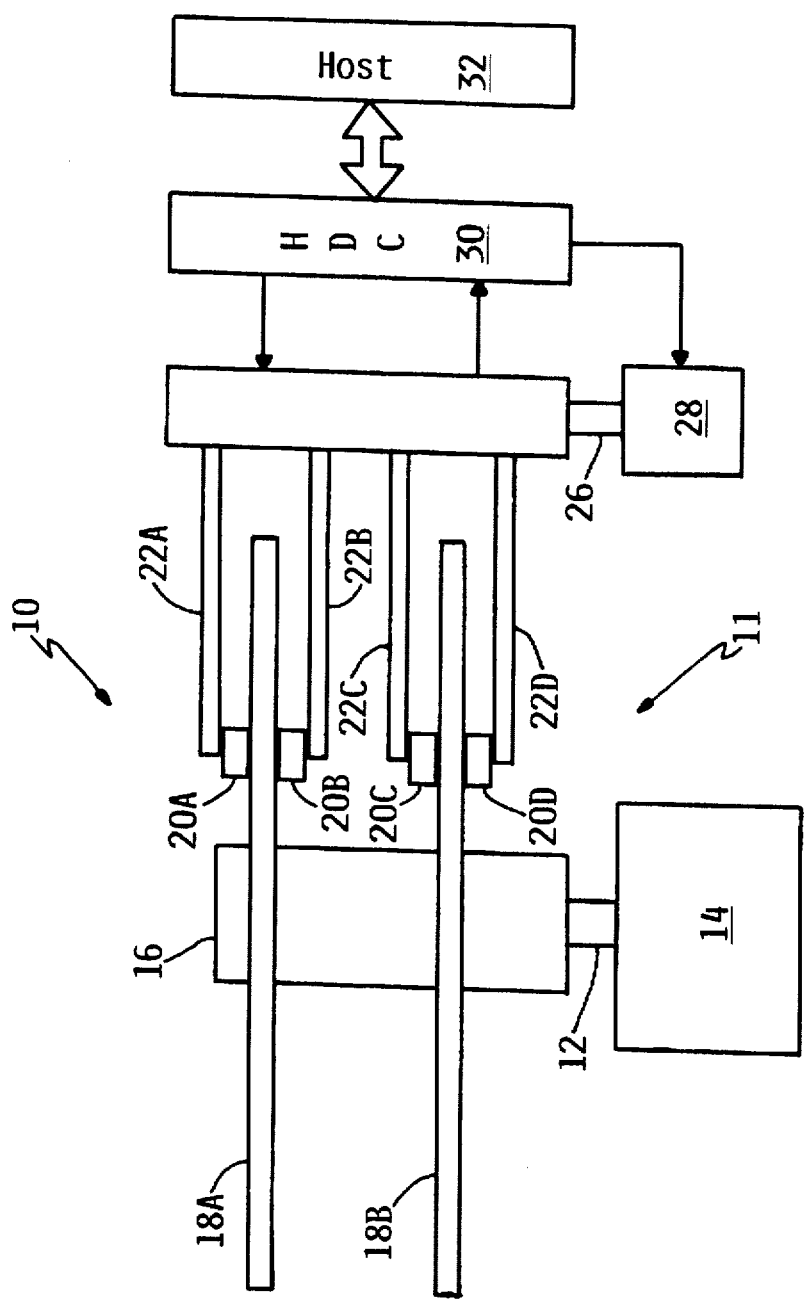
FIG. 1 is a schematic diagram of a disk drive apparatus according to an embodiment of this invention.

FIG. 1 shows a hard disk drive apparatus (HDD) according to an embodiment of this invention. As shown in FIG. 1, the disk drive apparatus 10 comprises a disk assembly 11 and hard disk controller (HDC) 30 containing a local CPU. The disk assembly 11 comprises a disk drive (spindle motor) 14 which rotates a shaft 12 at a high speed. A cylindrical support structure 16 is mounted on the shaft 12 in such a manner that they are concentric with each other. One or more data storage disks for 18A, 18B are mounted on the outer surface of the supporting structure 16 at predetermined intervals. The disks 18A, 18B rotate together with the supporting structure 16 as one united body when the shaft 12 is rotated by the disk drive 14.

Signal transducer heads 20A, 20B, 20C, 20D are held by access arms 22A, 22B, 22C, 22D and face each disk surface, respectively. The access arms 22A, 22B, 22C, 22D are connected to a signal transducer head drive (voice coil motor) 28 through a shaft 26. The signal transducer heads 20A, 20B, 20C, 20D are positioned at a predetermined position by rotation of the shaft 26. The disk drive 14 and signal transducer head drive 28 are connected to the HDC 30. The number of rotations and rotation speed of shaft 26 are controlled by the HDC 30. The HDC 30 can be connected to a host 32.

Figure 2A:
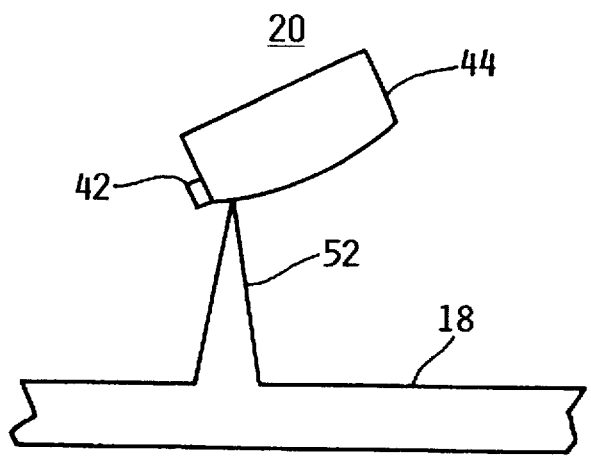
FIGS. 2A, 2B and 2C are diagrams showing states of operation in a disk drive apparatus according to an embodiment of this invention.
Figure 2B:
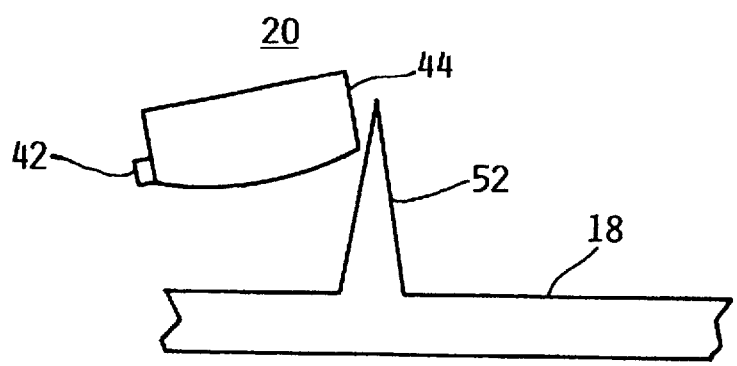
Figure 2C:
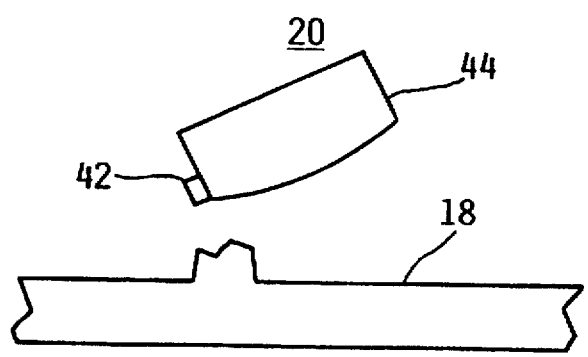

FIGS. 2A, 2B and 2C schematically show how a projection on a data recording surface of the disk is broken by contact with a positive pressure signal transducer head according to an embodiment of this invention. FIG. 2A shows the state in which a signal transducer head 20 equipped with an MR head 42 contacts a projection 52 on the disk 18 while reading data on the disk 18. The signal transducer head 20 includes the MR head 42 and an Air Bearing Surface (ABS) 44 holding the MR head 42. The signal transducer head 20 is tilted with respect to the direction of rotation by air pressure produced by the rotation of the disk. This tilt angle is called the "pitch angle." The pitch angle increases as the number of disk rotations increases. It decreases as the number of disk rotations, and therefore wind pressure, decreases. In FIG. 2A, the closest-to-disk point of the ABS 44 of the signal transducer head 20 contacts the projection 52.

Figure 3A:
FIGS. 3A and 3B are diagrams showing read signals in a disk drive apparatus according to an embodiment of this invention.

When the signal transducer head 20 is brought into contact with the projection 52 as shown in FIG. 2A, the temperature of the signal transducer head 20 rises as described earlier, and consequently, the resistance of the MR head 42 changes, and the read signal provided by the MR head 42 changes drastically. FIG. 3A shows this change in the read signal. In FIG. 3A, the drastic change point 62 in the signal pattern that can be seen when the projection is detected is caused by the temperature change of the MR head 42 and therefore ultimately by the projection 52. Such a projection, as described earlier, causes a drastic change in temperature of the head's MR stripe, and is often called a thermal asperity. A read signal produced by a thermal asperity is distinct from normal data signals. Therefore, if a steep read signal which is likely to be caused by a thermal asperity is detected, a data recovery operation is performed.

FIG. 2B shows the positions of the disk 18 and signal transducer head 20 when the rate of disk rotation is decreased by the data recovery operation according to an embodiment of this invention. The flying height of the signal transducer head 20 is lowered and comes closer to the disk 18. The pitch angle becomes smaller. That is, the signal transducer head 20 comes nearer to a position parallel to the disk. As a result, the side of the ABS 44 of the signal transducer head 20 hits the projection 52. The strike breaks the projection 52 as shown in FIG. 2C.

For example, assuming the disk rotation speed is 4870 rpm during read/write operation, a reduced rotation speed is set to 2060 rpm. The signal transducer head is lowered until its closest point to the disk nearly contacts the surface of the disk. The lowered height depends on the shape and weight of the signal transducer head. It is desirable that an appropriate level is selected accordingly. When the signal transducer head is lowered, it may remain in read mode or in the off state. For example, approximately 100 msec after the rotation speed reduction is started, the disk is brought into a low speed state, kept at this speed for 2 to 3 seconds, then returned to the normal rotation speed. After returning to the normal rotation speed, the read operation is performed again and the removal of the error is checked.

Figure 3B:

The data recovery operation ends with the break-off of the projection, i.e., thermal asperity, and the disk is returned to its normal rotation speed. When the disk returns to the normal rotation speed, the flying height of the signal transducer head increases. FIG. 3B shows the read signal after the data recovery operation. The steep signal change observed in FIG. 3A is eliminated, indicating that the projection (thermal asperity) has been removed.

Figure 4:
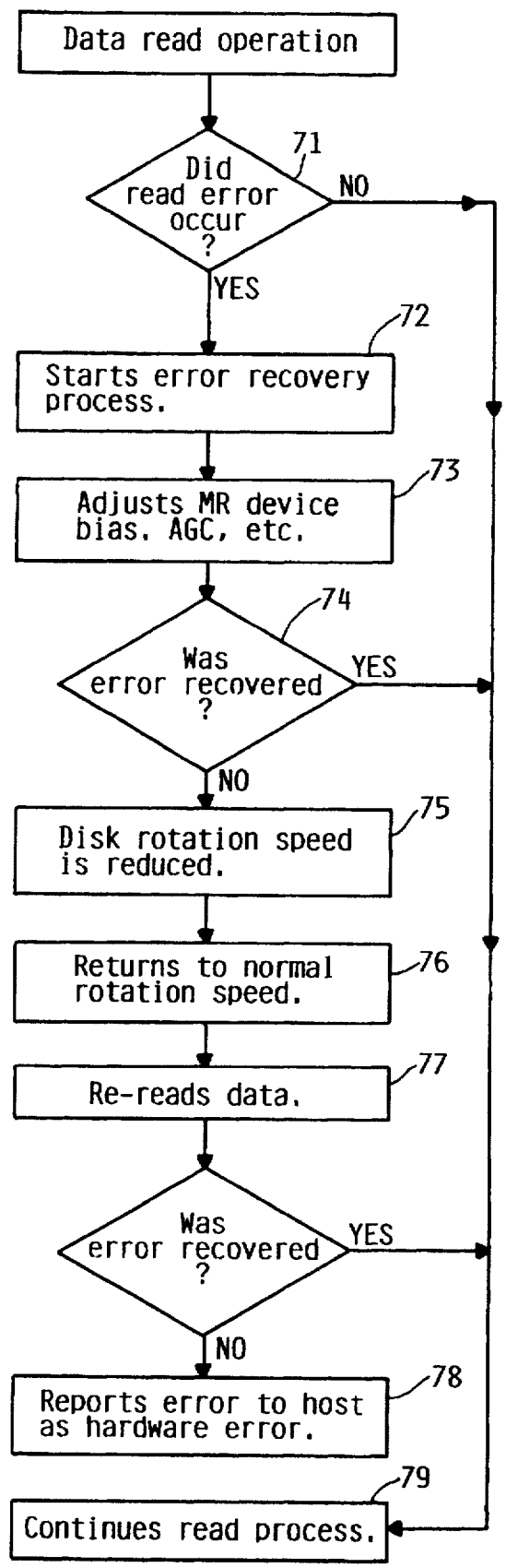
FIG. 4 is a flowchart showing a data recovery method according to an embodiment of this invention.

An embodiment of a data recovery method for removing a projection (thermal asperity) according to the present invention is described below with reference to FIG. 4. FIG. 4 is a flowchart showing an error recovery method according to an embodiment of the present invention. After a read error is detected at step 71, the data error recovery process starts at step 72. At step 73, conventional error recovery processes, for example, bias current change of the MR head, AGC gain adjustment, or some other error recovery processes are performed. After the error recovery processes, the data is re-read and if the data is read successfully, the operation exits the error recovery process routine (step 74) to return to the normal data read operation (step 79).

If the error is not corrected by these conventional steps, the flying height of the signal transducer head is changed by changing the disk rotation speed in accordance with this embodiment of the invention. At step 75, the disk speed is reduced, for example, from 4870 rpm to 2060 rpm as mentioned above. After a predetermined period of time, for example, 2 to 3 seconds, the normal rotation speed is returned (step 76). Then, at step 77, the data is re-read and if the data is read successfully, the error recovery process ends to return to the normal read operation (step 79). If the data read still fails, the error is reported as a hardware error to the host (step 78) and an appropriate action, such as data write to an alternative area, is performed.

An apparatus and method of another embodiment of this invention are described below. This embodiment uses a servo signal recorded on a disk to control the position of a signal transducer head to scrub and remove a projection, such as a thermal asperity.

Figure 5:
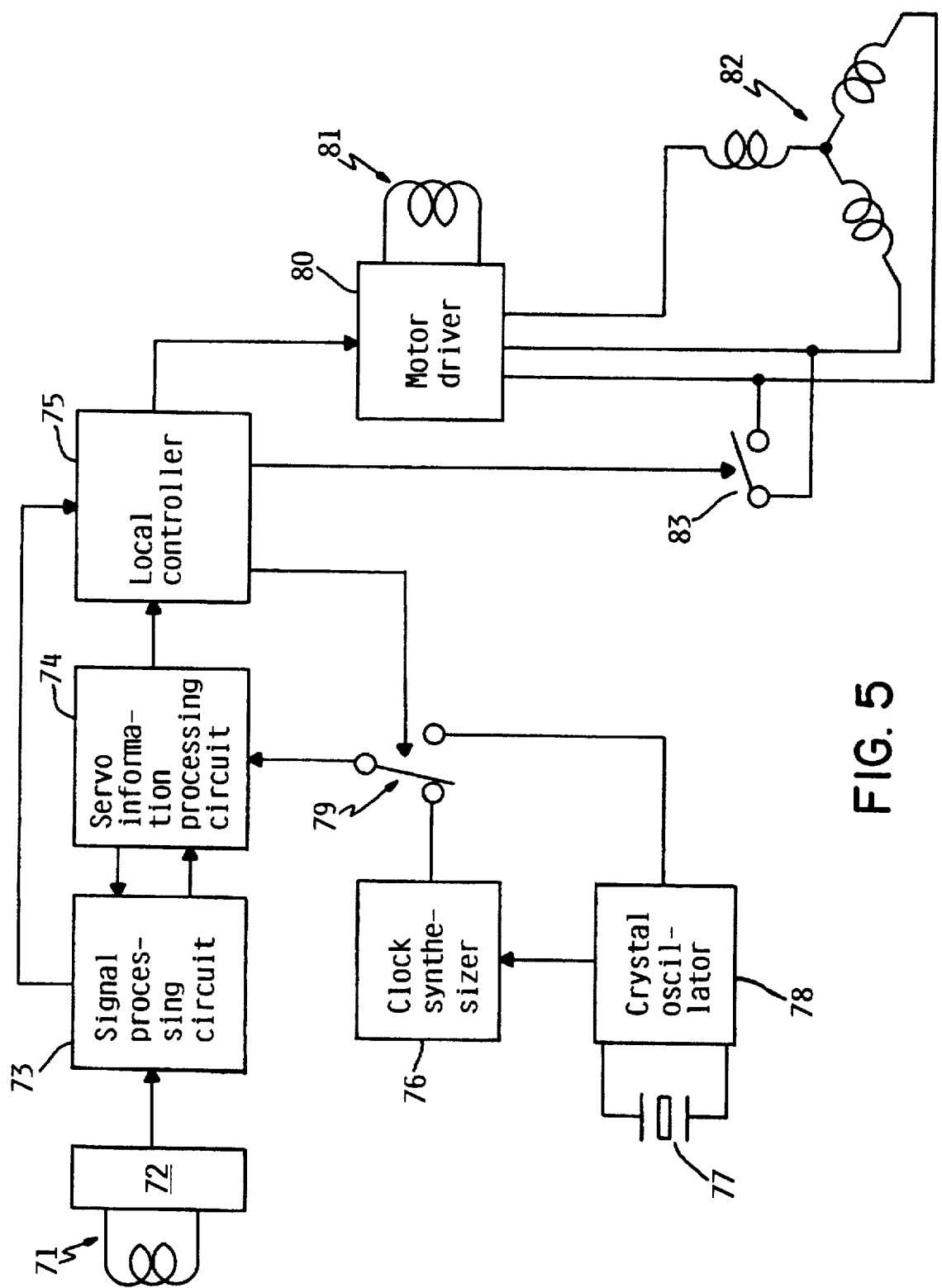
FIG. 5 is a block diagram showing a disk drive apparatus according to another embodiment of this invention.

When an error caused by a thermal asperity is encountered, the spindle motor is braked to spin-down more quickly. FIG. 5 is a block diagram that shows the main components of a disk drive apparatus of this embodiment.

In FIG. 5, a servo signal detected by a magnetic head 71 is amplified by a preamplifier 72, then a peak servo signal is detected and a pulse sequence is generated by a signal processing circuit 73. Based on this pulse sequence, a servo information processing circuit 74 detects a data identifier and generates a sample-and-hold timing. The clock used in this process is generated and supplied by a clock synthesizer 76, which generates any frequency, or by a crystal oscillator 78, which generates a frequency specific to a crystal oscillator element 77. Either clock synthesizer 76 or crystal oscillator 78 is selected by a change-over switch 79, which is activated by a local controller 75. That is, the switching is made according to a disk rotation speed.

Based on the servo information obtained as described above, the local controller 75 controls, via a motor driver 80, a current flowing into a voice coil motor (VCM) 81 to control the position of the head. Speed reduction of a spindle motor which drives a disk is accomplished by short-circuiting a switch 83 inserted between two different phases of a spindle motor 82 to apply a brake to the spindle motor 82. Thus, the speed reduction is accomplished in a short time.

When an error caused by a projection, such as a thermal asperity, is detected in the disk drive apparatus shown in FIG. 5, the revolution speed of the spindle motor 82 is reduced, for example, to one half of the normal speed. In order to reduce the speed quickly, the spindle motor 82 is braked. The braking may be accomplished by applying short circuit between phases of the spindle motor 82 as described above, or by exciting the spindle motor 82 to bring it to a phase opposite to a normal phase.

The servo clock supply source is switched from the crystal oscillator 78 to the clock synthesizer 76. The output frequency of the clock synthesizer 76 is preset to one half of the frequency of a normal servo clock, that is, the servo clock based on the crystal oscillator 78. Thus, the servo data recorded on the disk, the rotation speed of which is reduced, can be read by using the magnetic head 71.

Under the conditions allowing servo data on the disk to be read, the magnetic head 71 is positioned over a track on which an error occurs and moved forward and backward, for example +/–50 tracks, from that track to make the ABS side of the signal transducer head scrub away a projection, such as a thermal asperity. The servo data read from the disk during this operation enables the signal transducer head to be positioned accurately for scrubbing. After scrubbing for a predetermined period of time, the disk rotation speed is returned to a normal speed, the servo clock supply source is switched back to the crystal oscillator 78, and then a read/wlite operation is retried.

Because the signal transducer head performs the scrubbing operation while reading servo data, accurate control can be achieved. For example, it can be moved 50 tracks inward or outward from a track on which an error occurred. The movement of the signal transducer head may be controlled by specifying X tracks inward or outward as the target tracks, or by specifying the number of tracks to be skipped. The signal transducer head may be moved one track for one disk rotation or several tracks for one disk rotation.

Since a track on which an error occurred might cause additional errors, an alternative area on the disk may be used instead of the erroneous track by changing the address to ensure the reliability of subsequent data read/write operations.

In yet another embodiment of this invention, a bimetal element and a heating element are attached to a head suspension, which is a mounting structure of a signal transducer head. If the disk drive apparatus detects an error, it heats the heating element on the suspension while the element is in the proximity of a track on which the error occurred. Heat from the heating element flexes the bimetal element to force the signal transducer head to reduce its flying height. While the flying height being reduced, the signal transducer head traverses the disk to scrub away a projection, such as a thermal asperity.

Figure 6A:
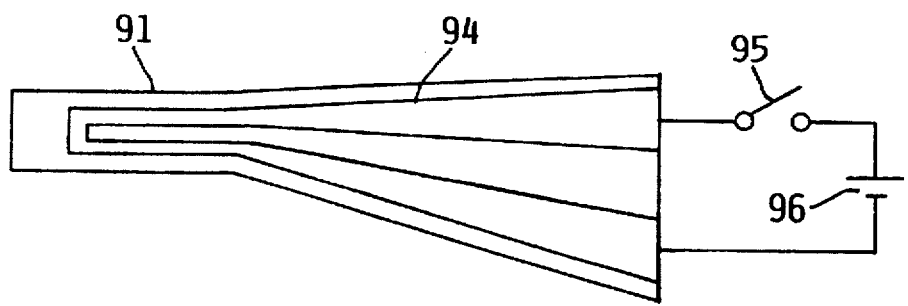
FIGS. 6A and 6B are top and side views, respectively, of a suspension structure according to yet another embodiment of this invention.
Figure 6B:
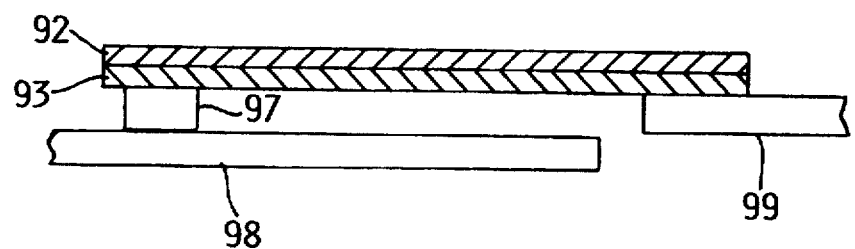

FIGS. 6A and 6B are top and side views, respectively, of a suspension having a bimetal element according to this embodiment. The suspension 91 fixed on a head arm 99 comprises of a bimetal element, that is, an element formed of a first material 92 with a higher linear thermal expansion coefficient, for example SUS 303, and a second material 93 with a lower linear thermal expansion coefficient, for example SUS 406, bonded together. A heating element 94 is formed on the material 93 of the suspension by printing a resistance element made of a material such as carbon. The heating can be controlled by a DC voltage source 96 and a switch 95. When the switch 95 is closed, electric current is conducted through the heating element and a difference between the linear coefficients of the two materials causes the suspension to flex. This, in turn, moves a signal transducer head 97 close to a disk 98, causing the flying height of the signal transducer head 97 to decrease.

In the suspension shown in FIGS. 6A and 6B, when the heating element 94 is heated while the signal transducer head 97 is over the proximity of a track on which an error occurred, the bimetal element bends in the direction which moves the signal transducer head 97 closer to the surface of disk 98, and as a result, the flying height of the signal transducer head 97 is reduced. While the flying height is reduced, scrubbing operation is performed over the track on which the error occurred and over its proximity to remove a projection, such as a thermal asperity. After scrubbing, the signal transducer head 97 returns to its normal flying height for data read/write operations. That is, the heating of the heating element 94 is stopped. The read/write operation is retried to ensure that the projection was removed.

It will be appreciated that, although specific embodiments of the invention have been described herein for purposes of illustration, various modifications may be made without departing from the spirit and scope of the invention. In particular, the data recovery method for an embodiment using a positive pressure signal transducer head configuration is described with reference to the flowchart shown in FIG. 4. In that embodiment, the flying height of the signal transducer head decreases as the disk rotation speed decreases. In an embodiment using a negative pressure signal transducer head configuration, on the other hand, the disk rotation speed is increased to lower the flying height of the signal transducer head. Also, the order of error recovery processes is not limited to the order shown in FIG. 4. For example, an error recovery process for an error cause which occurs most frequently may be performed first. Accordingly, the scope of protection of this invention is limited only by the following claims and their equivalents.

We claim:

1. A disk drive apparatus which rotates a data storage disk and reads data on said disk using a signal transducer head floating at a first flying height over a track on said disk, said disk drive apparatus comprising:

detecting means for detecting a read error in a read signal output from said signal transducer head when said signal transducer head is floating at said first flying height over said track; and read error recovery means, responsive to said detecting means detecting a read error, for recovering from said read error by reducing the flying height of said signal transducer head from said first flying height while said signal transducer head is floating over said track to make said signal transducer head strike and break a projection on said disk.

2. A disk drive apparatus as recited in claim 1, wherein: said signal transducer head includes a magnetoresistive (MR) head, and said read error is caused when the temperature of said MR head increases when said signal transducer head contacts said projection.

3. A method of recovering from a read error in a disk drive apparatus which rotates a data storage disk and reads data on said disk using a signal transducer head floating at a first flying height over a track on said disk, said method comprising the steps of:

detecting a read error in a read signal output from said signal transducer head when said signal transducer head is floating at said first flying height over said track; and reducing the flying height of said signal transducer head, in response to detecting said read error, from said first flying height while said signal transducer head is floating over said track to make said signal transducer head strike and break a projection on said disk.

4. A disk drive apparatus which rotates a data storage disk and reads data on said disk using a signal transducer head floating over said disk, said signal transducer head floats at a first flying height over a track on said disk when said disk rotates at a normal rotation speed, said disk drive apparatus comprising:

detecting means for detecting a read error in a read signal output from said signal transducer head when said signal transducer head is floating at said first flying height over said track;

read error recovery means, responsive to said detecting means detecting a read error, for recovering from said read error by changing the rotation speed of said disk from said normal rotation speed to another rotation speed while said signal transducer head is floating over said track to reduce the flying height of said signal transducer head from said first flying height and to make said signal transducer head strike and break a projection on said disk;

servo positioning means, responsive to a servo clock signal and to a servo signal output from said signal transducer head in response to servo data on said disk, for positioning said signal transducer head over said track both when the rotation speed of said disk is said normal rotation speed and said another rotation speed; and servo clock supplying means for supplying said servo clock signal to said servo positioning means and for changing the frequency of said servo clock signal based on the rotation speed of said disk.

5. A disk drive apparatus as recited in claim 4, wherein:

said read error is caused by said signal transducer head contacting said projection, and wherein said projection is a thermal asperity.

6. A disk drive apparatus as recited in claim 4, wherein:

said signal transducer head is a positive pressure signal transducer head, wherein said flying height of said positive pressure signal transducer head increases as the rotation speed of said disk increases; and said read error recovery means reduces the rotation speed of said disk from said normal rotation speed.

7. A disk drive apparatus as recited in claim 5, wherein:

said signal transducer head is a positive pressure signal transducer head, wherein said flying height of said positive pressure signal transducer head increases as the rotation speed of said disk increases; and said read error recovery means reduces the rotation speed of said disk from said normal rotation speed.

8. A disk drive apparatus, comprising:

a spindle motor for rotating a data storage disk at a normal rotation speed and another rotation speed;

a voice coil motor for moving a signal transducer head over a track of said disk, said signal transducer head floats at a first flying height over said disk when said spindle motor rotates said disk at said normal rotation speed;

a signal processing circuit for detecting a read error in a read signal output from said signal transducer head when said signal transducer head is floating at said first flying height over said track on said disk;

a controller, responsive to said signal processing circuit detecting a read error, for changing the rotation speed of said disk from said normal rotation speed to said another rotation speed while said signal transducer head is floating over said track to reduce the flying height of said signal transducer head from said first flying height and to make said signal transducer head strike and break a projection on said disk;

a servo information processing circuit, responsive to a servo clock signal and to a servo signal output from said signal transducer head in response to servo data on said disk, for positioning said signal transducer head over said track both when the rotation speed of said disk is said normal rotation speed and said another rotation speed; and a servo clock source for supplying said servo clock signal to said servo information processing circuit and for changing the frequency of said servo clock signal based on the rotation speed of said disk.

9. A controller for a disk drive apparatus which rotates a data storage disk and reads data on said disk using a signal transducer head floating over said disk, said signal transducer head floats at a first flying height over a track on said disk when said disk rotates at a normal rotation speed, said disk drive apparatus includes detecting means for detecting a read error in a read signal output from said signal transducer head when said transducer is floating at said first flying height over said track on said disk, said controller comprising:

speed changing means, responsive to said detecting means detecting a read error, for changing the rotation speed of said disk from said normal rotation speed to another rotation speed while said signal transducer head is floating over said track to reduce the flying height of said signal transducer head from said first flying height and to make said signal transducer head strike and break a projection on said disk;

servo positioning means, responsive to a servo clock signal and to a servo signal output from said signal transducer head in response to servo data on said disk, for positioning said signal transducer head over said track both when the rotation speed of said disk is said normal rotation speed and said another rotation speed; and means for changing the frequency of said servo clock signal based on the rotation speed of said disk.

10. A method for recovering from read errors in disk drive apparatus which rotates a data storage disk and reads data on said disk using a signal transducer head floating over said disk, said signal transducer head floats at a first flying height over a track on said disk when said disk rotates at a normal rotation speed, said method comprising the steps of:

detecting a read error in a read signal output from said signal transducer head when said transducer is floating at said first flying height over said track on said disk;

changing the rotation speed of said disk, when said read error is detected, from said normal rotation speed to another rotation speed while said signal transducer head is floating over said track to reduce the flying height of said signal transducer head from said first flying height and to make said signal transducer head strike and break a projection on said disk;

positioning said signal transducer head over said track both when the rotation speed of said disk is said normal rotation speed and said another rotation speed based on a servo clock signal and on a servo signal output from said signal transducer head in response to servo data on said disk; and changing the frequency of said servo clock signal based on the rotation speed of said disk.

11. A method for recovering from read errors as recited in claim 10, wherein said read error is caused by said signal transducer head contacting said projection, said projection being a thermal asperity, said step of changing the rotation speed of said disk including the substep of said signal transducer head striking and breaking said thermal asperity.

12. A method for recovering from read errors as recited in claim 10, wherein said signal transducer head is a positive pressure signal transducer head, wherein said flying height of said positive pressure signal transducer head increases as the rotation speed of said disk increases, said step of changing the rotation speed of said disk including the substep of reducing said rotation speed of said disk from said normal rotation speed.

13. A method for recovering from read errors as recited in claim 11, wherein said signal transducer head is a positive pressure signal transducer head, wherein said flying height of said positive pressure signal transducer head increases as the rotation speed of said disk increases, said step of changing the rotation speed of said disk including the substep of reducing said rotation speed of said disk from said normal rotation speed.

14. A disk drive apparatus which rotates a data storage disk and reads data on said disk using a signal transducer head floating over said disk, said signal transducer head floats at a first flying height over a track on said disk, said disk drive apparatus comprising:

detecting means for detecting a read error in a read signal output from said signal transducer head when said signal transducer head is floating at said first flying height over said track;

a suspension supporting said signal transducer head, said suspension including a bimetal element and a heating element for heating said bimetal element, said bimetal element being arranged to reduce the flying height of said signal transducer head when heated by said heating element; and read error recovery means, responsive to said detecting means detecting a read error, for recovering from said read error by activating said heating element to reduce the flying height of said signal transducer head from said first flying height while said signal transducer head is floating over said track and to make said signal transducer head strike and break a projection on said disk.

15. A method for recovering from read errors in a disk drive apparatus which rotates a data storage disk and reads data on said disk using a signal transducer head floating over said disk, said signal transducer head floats at a first flying height over a track on said disk, said disk drive apparatus including a suspension supporting said signal transducer head, said suspension including a bimetal element and a heating element for heating said bimetal element, said bimetal element being arranged to reduce the flying height of said signal transducer head when heated by said heating element, said method comprising the steps of:

detecting a read error in a read signal output from said signal transducer head when said signal transducer head is floating at said first flying height over said track; and activating said heating element, in response to said detecting means detecting said read error, to reduce the flying height of said signal transducer head from said first flying height while said signal transducer head is floating over said track and to make said signal transducer head strike and break a projection on said disk.

* * * * *